US006595897B1

(12) United States Patent
Dykstra et al.

(10) Patent No.: US 6,595,897 B1
(45) Date of Patent: Jul. 22, 2003

(54) COMBINATION SPEED LIMITER AND TRANSMISSION INTERLOCK SYSTEM

(75) Inventors: Richard A. Dykstra, Cedar Grove, WI (US); Charles Hardy Ketelhohn, Cedarburg, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/086,607

(22) Filed: Mar. 1, 2002

(51) Int. Cl.[7] .............................................. F16H 59/74
(52) U.S. Cl. .......................................... 477/99; 440/75
(58) Field of Search .............................. 477/99; 440/75

(56) References Cited

U.S. PATENT DOCUMENTS 3,689,775 A 9/1972 Smith et al.
3,718,128 A 2/1973 Botker
3,726,265 A 4/1973 Howard
3,776,204 A 12/1973 Harris
3,782,084 A * 1/1974 Harkness .................... 56/10.5
3,875,915 A 4/1975 Anderson et al.
4,033,311 A 7/1977 Burson
4,074,665 A 2/1978 Patis
4,144,859 A 3/1979 Ohki et al.
4,163,431 A 8/1979 Wilkinson
4,223,657 A 9/1980 Sato et al.
4,404,940 A 9/1983 Sieja
4,648,366 A 3/1987 Thornton-Trump
4,726,798 A * 2/1988 Davis .......................... 440/75
4,776,311 A 10/1988 Venieres et al.
4,817,466 A * 4/1989 Kawamura et al. ........... 477/99
4,911,126 A 3/1990 Notaras et al.
4,977,877 A 12/1990 Dykstra
5,078,104 A 1/1992 Peterson, Jr.
5,188,069 A 2/1993 Fiorenza, II
5,245,965 A 9/1993 Andersson
6,040,767 A 3/2000 Dykstra
6,116,212 A 9/2000 Dykstra

* cited by examiner

*Primary Examiner*—Dirk Wright
(74) *Attorney, Agent, or Firm*—Michael Best & Friedrich LLP

(57) ABSTRACT

A combination speed limiter and transmission interlock system for an engine-transmission power train that includes an internal combustion engine and a transmission, the power train of the type used to power outboard engines and the like. The system utilizes fewer connections, is less expensive, is expected to be more reliable, utilizes a single housing, is easier to manufacture, and uses fewer components than a power train that utilizes separate speed limiter and transmission interlock modules.

48 Claims, 6 Drawing Sheets

COMBINATION SPEED LIMITER AND TRANSMISSION INTERLOCK SYSTEM

BACKGROUND OF THE INVENTION

The present invention relates to a combination speed limiter and transmission interlock system, and more particularly to a combination speed limiter and transmission interlock system for engine-transmission power trains such as outboard motors.

Conventional outboard motors typically comprise a speed limiter module and a transmission interlock module. These modules are separate from each other. Each module requires its own external connections, components, housing, and manufacturing.

One disadvantage of the foregoing separate modules is that they require numerous connections external to the modules. Some of the connections are duplicated from module to module. For example, both the speed limiter module and the transmission interlock module typically require a connection to a coil of the ignition system of the engine and a connection to ground. The transmission interlock module also typically requires two connections to a switch interconnected to the transmission. A large number of connections increases the likelihood of a failure. If any of these connections is broken, either deliberately or by accident, the effectiveness of the representative individual module may be lost.

Another disadvantage of the foregoing separate modules is that they require a separate housing for each module. Two separate housings necessitate additional tooling, manufacturing time, space in the outboard motor housing, components, and connections. On outboard motors and the like, space considerations are a concern.

SUMMARY OF THE INVENTION

A combination speed limiter and transmission interlock system for an outboard motor and/or other engine-transmission power train (e.g., a lawnmower) is disclosed which is inexpensive, expected to be more reliable, and which may be retrofit on and/or made an option of an existing and/or new outboard motor and/or other engine-transmission power train. The combination speed limiter and transmission interlock system is preferably used with an engine-transmission power train including an engine having a fixed-timing ignition system and a transmission interconnected to a transmission switch. The ignition system may include a coil that generates an ignition pulse that is utilized to cause an igniter to ignite an air-fuel mixture, thereby resulting in a combustion event. The transmission switch may indicate when the transmission is in a neutral position and when the transmission is in an in-gear position.

The combination speed limiter and transmission interlock system of the invention is preferably located in a single module having a housing. The module includes circuitry that performs both speed limiter and transmission interlock functions. The speed limiter portion limits the output of the engine when a limit speed is reached. The transmission interlock portion prevents the engine from starting when the transmission is not in neutral.

The circuitry is electrically coupled to the coil, ground (e.g., metal chassis or frame) and the transmission switch via electrical conduits (e.g., leads or wires) that extend external of the housing. The circuitry includes an ignition control circuit that prevents the igniter from igniting the air-fuel mixture to cause a combustion event, a speed control circuit that causes the ignition control circuit to prevent the igniter from igniting the air-fuel mixture when the engine exceeds a limit speed, and a start control circuit that causes the ignition control circuit to prevent the igniter from igniting the air-fuel mixture when the transmission switch indicates the in-gear position of the transmission during starting of the engine. The circuitry may also include an inhibitor control circuit that prevents the start control circuit from causing the ignition control circuit to prevent the igniter from igniting the air-fuel mixture when the transmission switch indicates the in-gear position of the transmission during running of the engine.

In one embodiment, the invention provides an analog version of the combination speed limiter and transmission interlock system. The ignition control circuit includes a switch that is responsive to signals received from the speed control circuit and the start control circuit. The speed control circuit includes a speed circuit and an electrical storage device for receiving electrical energy that is associated with the ignition pulse. In one embodiment, the electrical storage device receives the electrical energy during the leading half-cycle of the ignition pulse, although the center half-cycle or the trailing half-cycle of the ignition pulse could be used. The voltage of the electrical energy received by the electrical storage device is limited by the speed circuit. The speed circuit receives the electrical energy discharged from the electrical storage device, and generates a signal based on the electrical energy received. If the received electrical energy is above a minimum voltage value at the time a combustion event is suppose to occur, the signal acts as a trigger that turns ON the switch of the ignition control circuit, thereby limiting the voltage of the ignition pulse to a value too low to cause the igniter to ignite.

When the transmission switch is the in-gear position during engine starting, the start control circuit turns ON the switch of the ignition control circuit. When the transmission switch is in the neutral position during engine starting, the switch remains in the OFF position. After proper engine startup, upon reaching a minimum engine speed, the inhibitor circuit inhibits the start control circuit from turning ON the switch, thereby allowing the operator to shift the transmission out of neutral for operation of the power train.

In another embodiment, the invention provides a digital version of the combination speed limiter and transmission interlock system. The digital system includes a programmable device. The programmable device utilizes a software program having a plurality of instructions, and interprets and executes the software instructions to control the outboard motor and/or other engine-transmission power train. The speed limiter of the digital system is configured to limit the output of the engine when a limit speed is reached. The transmission interlock of the digital system is configured to prevent the engine from starting when the transmission is not in neutral. The software program includes instructions corresponding to speed limiter and transmission interlock functions. In one embodiment, analog components associated with the programmable device provide inputs to the programmable device including a signal corresponding to the speed of the engine and a signal corresponding to the position of the transmission (e.g., in neutral or in gear). Based on the inputs, the programmable device determines a limit condition (i.e., whether or not the voltage of the ignition pulse needs to be limited). The programmable device provides an output corresponding to the limit condition to the ignition control circuit. If the programmable device determines the voltage of the ignition pulse needs to be limited, the output corresponding to the limit condition causes a switch to be turned ON, thereby limiting the voltage of the ignition pulse. If the programmable device determines the voltage of the ignition pulse does not need to be limited, the output corresponding to the limit condition causes the switch to be turned OFF, thereby allowing the voltage of the ignition pulse to be utilized to ignite the igniter. In one embodiment, the voltage of the ignition pulse is limited to a value below that which is necessary to ignite the igniter. The voltage of the ignition pulse is limited, for example, if the engine has reached a limit speed and/or if the transmission is not in neutral when the operator attempts to start the engine.

The digital system may further include a power supply circuit for providing a power signal and ground to the programmable device, a brown-out circuit for detecting when the power signal drops below a level required to sustain operation of the programmable device, a memory device for recording the number of operating hours of the power train, and software instructions corresponding to the calculation of the number of operating hours of the power train.

It is a feature and an advantage of the present invention to provide a simple and inexpensive combination speed limiter and transmission interlock system which may be retrofit on and/or an option of an engine-transmission power train.

It is another feature and advantage of the present invention to provide a combination speed limiter and transmission interlock system using standard analog and/or digital, off-the-shelf components.

It is another feature and advantage of the present invention to provide a combination speed limiter and transmission interlock system having minimal connections to the coil, the ground and the transmission switch.

It is another feature and advantage of the present invention to provide a combination speed limiter and transmission interlock system requiring less space than that occupied by two separate speed limiter and transmission interlock modules.

It is another feature and advantage of the present invention to provide a combination speed limiter and transmission interlock system that is less expensive to manufacture than two separate speed limiter and transmission interlock modules.

As is apparent from the above, it is an advantage of the invention to provide a combination speed limiter and transmission interlock system. Other features and advantages of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
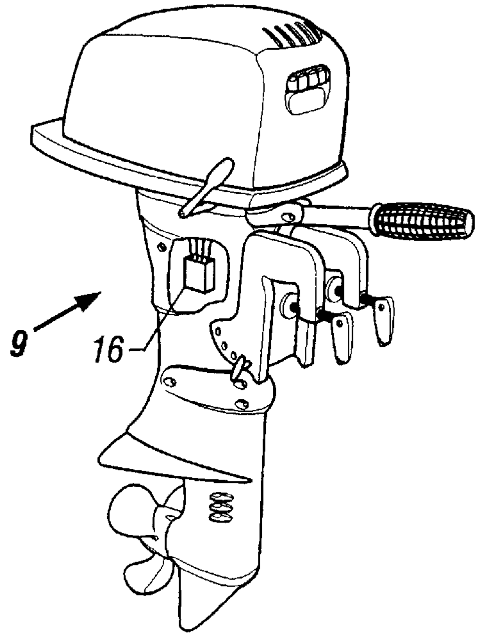
FIG. 1 illustrates a representative engine-transmission power train.

FIG. 1 illustrates an engine-transmission power train 9 representative of the type of power train a combination speed limiter and transmission interlock system 20 of the invention (see FIG. 4) is designed for use on. It should be understood that the present invention is capable of use on other power trains and the power train 9 is merely shown and described as an example of one such power train. The illustrated power train 9 is an outboard motor.

Figure 2:
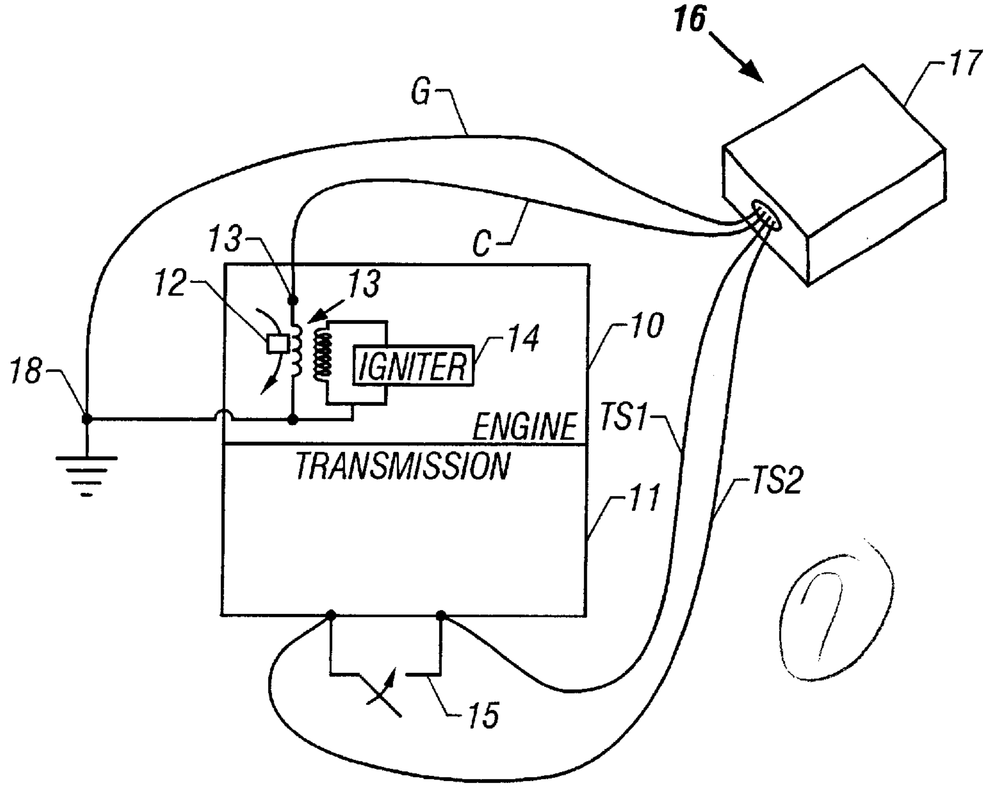
FIG. 2 illustrates a module including a combination speed limiter and transmission interlock system of the invention electrically coupled to the engine-transmission power train of FIG. 1.

FIG. 2 schematically illustrates an engine 10 and a transmission 11 of the power train 9. The engine 10 includes a magneto-type ignition system having a magnet 12 disposed on a rotating flywheel (not shown) that magnetically interacts with an ignition winding or coil 13. An ignition pulse (see FIG. 3) is generated by the coil 13 due to the interaction with the magnet 12. The ignition pulse is utilized to cause an igniter 14 to ignite. The igniter 14 typically ignites an air-fuel mixture, thereby resulting in a combustion event. The transmission 11 is interconnected to a transmission switch 15 that indicates if the transmission 11 is in a neutral position or an in-gear position.

The combination speed limiter and transmission interlock system 20 preferably includes a single module 16 having a housing 17. The module 16 is electrically coupled to the power train 9 and associated structure by a number of electrical conduits that extend external to the housing 17 including an electrical conduit G to a ground 18, an electrical conduit C to the coil 13 and electrical conduits TS1 and TS2 to the transmission switch 15. As illustrated in FIG. 1, the module 16 is mounted to the power train 9 in a housing of the outboard motor. The module 16 may be mounted at any location in the housing of the outboard motor, although preferably, it is mounted such that the lengths of the electrical conduits C, G, TS1 and TS2 are minimal.

Figure 3:
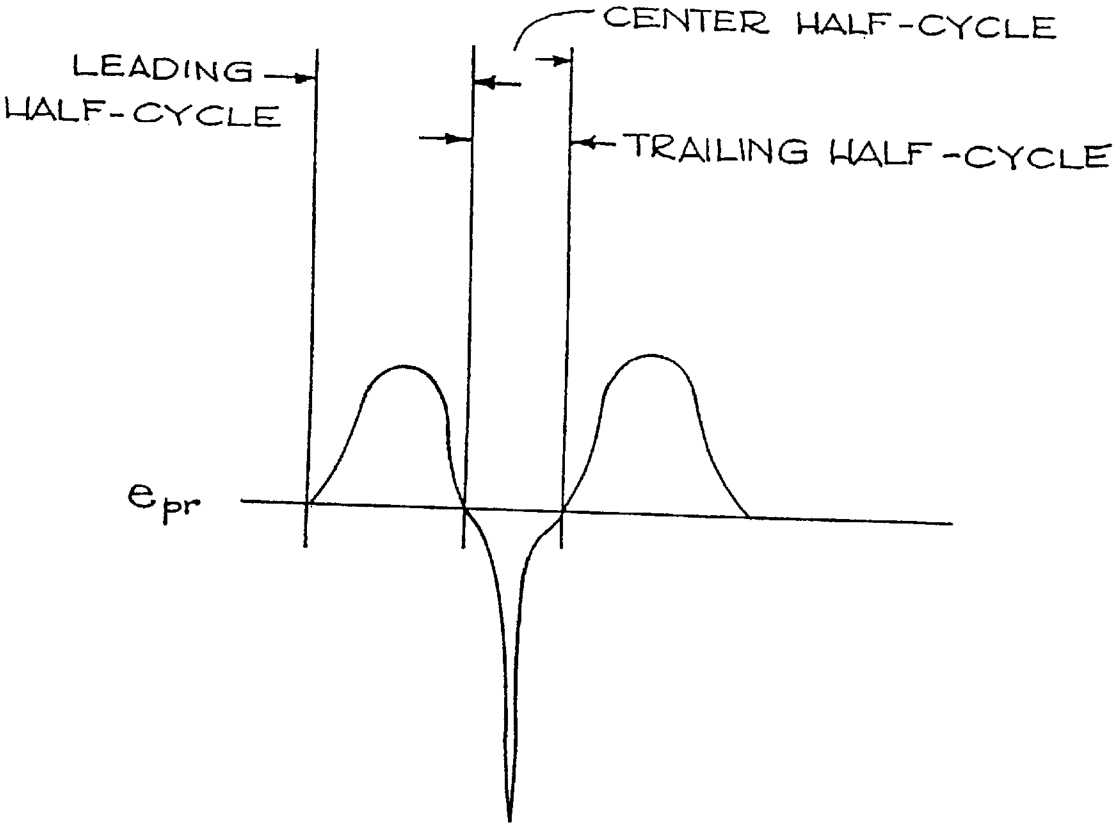
FIG. 3 illustrates an ignition pulse output from the coil of FIG. 2.

FIG. 3 illustrates the ignition pulse generated by the interaction between the magnet 12 and the coil 13. A similar ignition pulse is generated for each revolution of the flywheel on which the magnet 12 is disposed. The ignition pulse includes a leading half-cycle and a trailing half-cycle of one polarity, and a center half-cycle of an opposite polarity. The center half-cycle is generally used to cause the igniter 14 (e.g., a spark plug) to ignite. Electrical energy associated with the ignition pulse may also be utilized to power components of the combination speed limiter and transmission interlock system 20. Generally, use of electrical energy associated with the ignition pulse eliminates the need for a battery to power components of the combination speed limiter and transmission interlock system 20. In other embodiments, another coil configured to interact with the magnet 12 may be utilized to power components instead of the coil 13.

Figure 4:
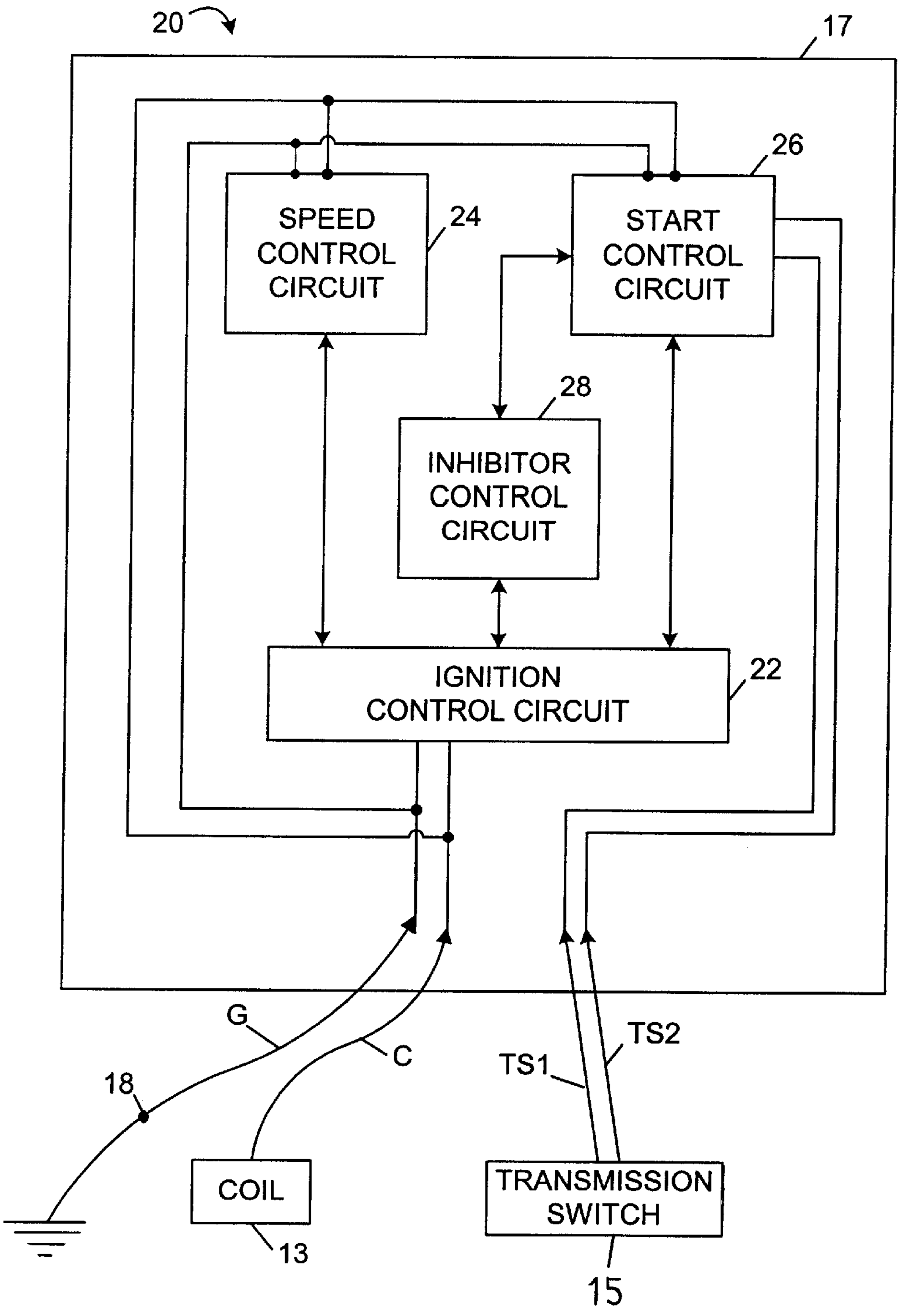
FIG. 4 schematically illustrates a functional diagram of a combination speed limiter and transmission interlock system of the invention.

The combination speed limiter and transmission interlock system 20 of the invention is shown in FIG. 4. The combination speed limiter and transmission interlock system 20 includes an ignition control circuit 22 that prevents the igniter 14 from igniting the air-fuel mixture, a speed control circuit 24 that causes the ignition control circuit 22 to prevent the igniter 14 from igniting the air-fuel mixture when the engine 10 exceeds a limit speed, and a start control circuit 26 that causes the ignition control circuit 22 to prevent the igniter 14 from igniting the air-fuel mixture when the transmission switch 15 indicates the in-gear position of the transmission 11 during starting of the engine 10. The combination speed limiter and transmission interlock system 20 may also include an inhibitor control circuit 28 that prevents the start control circuit 26 from causing the ignition control circuit 22 to prevent the igniter 14 from igniting the air-fuel mixture when the transmission switch 15 indicates the in-gear position of the transmission 11 during running of the engine 10. The functional blocks of FIG. 4 correspond to the like numbered blocks shown in broken lines in the detailed circuit schematic of FIGS. 5 and 6.

Figure 5:
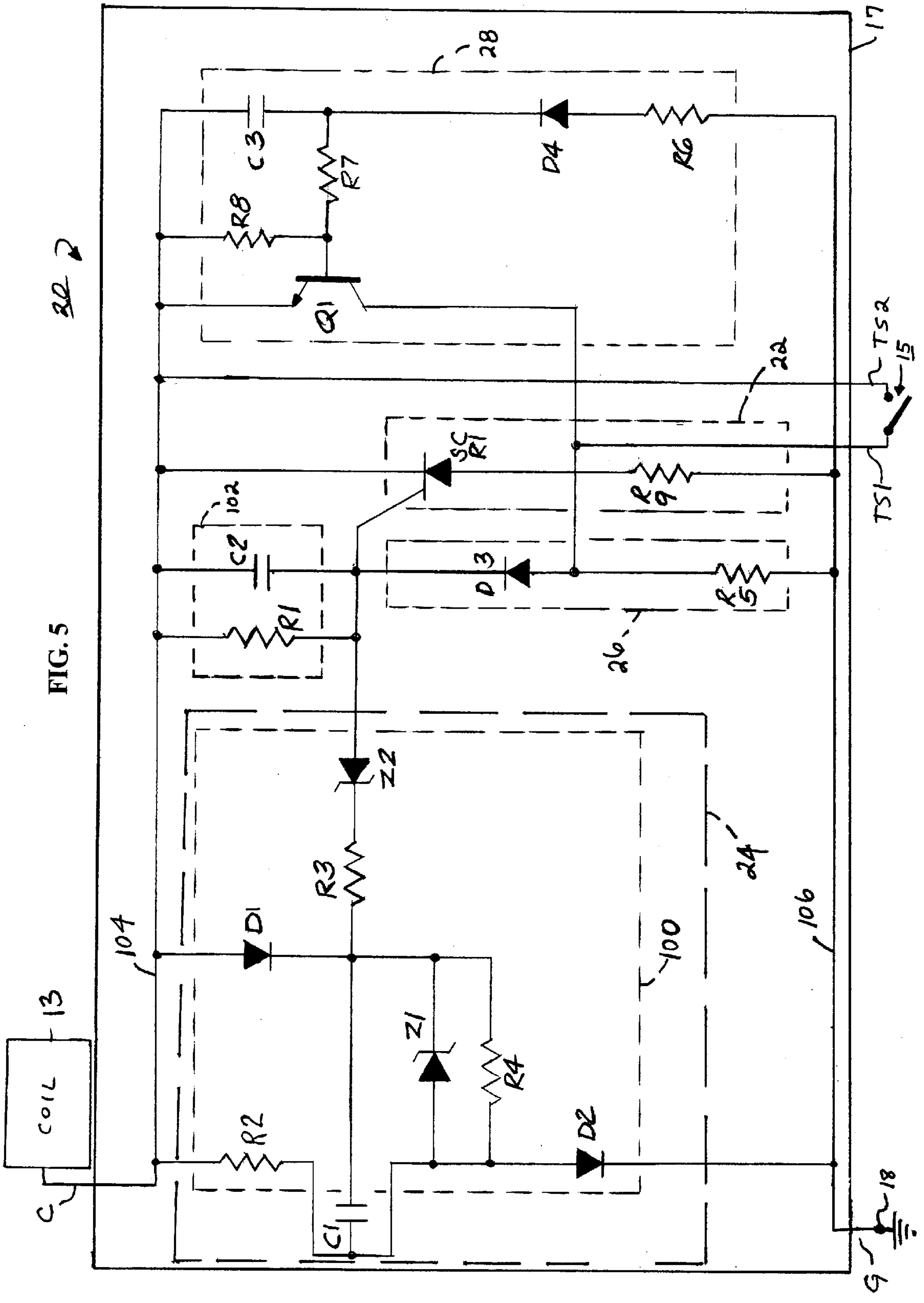
FIG. 5 is a schematic drawing of an analog version of the combination speed limiter and transmission interlock system illustrated in FIG. 4.

FIG. 5 is a schematic drawing of an analog version of the combination speed limiter and transmission interlock system 20. Referring to FIG. 5, the portion of the circuitry used exclusively by the speed limiter includes the speed control circuit 24. The speed control circuit 24 includes an electrical storage device or capacitor C1 and a speed circuit 100. The speed circuit 100 includes resistors R2, R3 and R4, rectifiers D1 and D2 and zener diodes or switches Z1 and Z2.

The portion of the circuitry used exclusively by the transmission interlock includes the start control circuit 26 and the inhibitor control circuit 28. The transmission switch 15 is also associated with the transmission interlock. In one embodiment, the circuitry is connected to the transmission switch 15 via the electrical conduits TS1 and TS2 that extend external to the housing 17. The start control circuit 26 includes a rectifier D3 and a resistor R5. The inhibitor control circuit 28 includes an electrical storage device or capacitor C3, a rectifier D4, resistors R6, R7 and R8 and a semiconductor or other switch Q1.

Both the speed limiter and the transmission interlock utilize a prevention circuit 102, the ignition control circuit 22, a power node 104, and a ground node 106. The prevention circuit 102 includes an electrical storage device or capacitor C2 and a resistor R1. The ignition control circuit 22 includes a silicon controlled rectifier or other switch SCR1 and a resistor R9. In one embodiment, the power node 104 is connected to the coil 13 via the electrical conduit C that extends external to the housing 17. The power node 104 preferably provides the circuitry electrical energy associated with the ignition pulse. In one embodiment, the ground node 106 is connected to the ground 18 via the electrical conduit G that extends external to the housing 17.

During the leading half-cycle of the ignition pulse, the electric storage device C1 charges via the rectifiers D1 and D2. The zener diode Z1 limits the voltage of the electrical storage device C1 to a predetermined value regardless of the voltage of the ignition pulse. In addition to other functions, the zener diode Z1 prevents excessive and/or transient voltages from adversely affecting the circuitry.

After the leading half-cycle of the ignition pulse reaches its peak and falls below the minimum voltage required to sustain conduction through the electrical storage device C1 and the rectifiers D1 and D2, the electrical storage device C1 stops charging and begins to discharge through the speed circuit 100. The speed circuit 100 receives the electrical energy discharged from the electrical storage device C1 and generates an output signal corresponding to the electrical energy received. The voltage of the output signal depends upon whether the electrical energy received by the speed circuit 100 is above a minimum voltage value required to sustain conduction through the zener diode Z2. If the electrical energy received by the speed circuit 100 is above the minimum voltage value, the output signal is known as a trigger and is utilized to turn ON the switch SCR1. If the electrical energy received by the speed circuit 100 is below the minimum voltage value, the output signal is null and does not turn ON the switch SCR1.

In one embodiment, the switch SCR1 includes a silicon controlled rectifier, however, any device that is capable of turning ON (or OFF) in response to a trigger signal could be used. Accordingly, other types of thyristors, such as a triac, could be used.

If the electrical energy received by the speed circuit 100 is above the minimum voltage value required for the output signal to be a trigger, then the electrical energy discharges from the positive terminal of the electrical storage device C1 through the resistor R3, the zener diode Z2, the gate to cathode junction of the switch SCR1, the resistor R2, and back to the negative terminal of the electrical storage device C1. In one embodiment, the minimum voltage value is set by the zener diode Z2.

At low engine speeds, the electrical energy discharging from the electrical storage device C1 drops below the minimum voltage value required by the speed circuit 100 to generate a trigger output signal before the center half-cycle of the ignition pulse begins. When the output signal is not a trigger and therefore is not turning ON the switch SCR1 (the switch SCR1 is therefore OFF) during the center half-cycle of the ignition pulse, the entire voltage of the ignition pulse is provided to the igniter 14 in a normal manner and combustion events may occur.

When the engine speed reaches a predetermined value, or limit speed, the electrical energy discharging from the electrical storage device C1 remains above the minimum voltage value required by the speed circuit 100 to generate a trigger output signal after the center half-cycle of the ignition pulse begins. When the trigger output signal is turning ON the switch SCR1 during the center half-cycle of the ignition pulse, the switch SCR1 conducts and shunts the center half-cycle voltage of the ignition pulse through the resistor R9. The resistor R9 acts as a current limiting resistor. Accordingly, the voltage of the ignition pulse is limited to a value too low to cause the igniter 14 to ignite. When the igniter 14 does not ignite at the appropriate time in the engine cycle, there is no combustion event, the speed of the engine 10 is reduced, and the engine speed therefore does not exceed the limit speed. In an alternative embodiment, the center half-cycle voltage of the ignition pulse could be shunted directly to ground 18 via the electrical conduit G, thereby shorting the ignition pulse and resulting in a reduction of the speed of the engine 10.

The electrical storage device C2 is positioned in parallel to the resistor R1 to form the prevention circuit 102. The prevention circuit 102 prevents any rapid change of voltage with respect to time from inadvertently turning ON the switch SCR1. In regard to the speed limiter, a rapid change of voltage with respect to time could occur due to a false transient trigger output signal. The resistor R1 allows the electrical storage device C2 to completely discharge between revolutions of the engine 10 (i.e., between each ignition pulse generated by the coil 13) such that the prevention circuit 102 functions to prevent any rapid change of voltage throughout the entire operation of the engine 10.

In one embodiment, the value of the resistor R4 can be set or calibrated, thus making it possible to set or trim the limit speed for each combination speed limiter and transmission interlock system 20 produced. Such calibration may be desirable in applications that require a high degree of signal repeatability.

In the present invention and referring again to FIG. 5, the start control circuit 26 prevents the engine from starting when the transmission switch 15 indicates the transmission 11 is in the in-gear position by turning ON the switch SCR1 during the center half-cycle of the ignition pulse. As discussed above, when turned ON, the switch SCR1 conducts and shunts the voltage of the center half-cycle of the ignition pulse through the current limiting resistor R9 and/or to ground 18 via the electrical conduit G. Accordingly, the voltage of the ignition pulse is limited to a value too low to cause the igniter 14 to ignite. When the igniter 14 does not ignite at the appropriate time, the engine does not start.

If the transmission switch 15 indicates the transmission 11 is in the neutral position when the operator attempts to start the engine, the start control circuit 26 does not prevent the engine 10 from starting. Once the engine 10 is running at a minimum engine speed, the inhibitor control circuit 28 is turned ON thereby preventing the start control circuit 26 from turning ON the switch SCR1. When the inhibitor control circuit 28 is turned ON, the switch SCR1 remains OFF independent of whether the transmission switch 15 indicates the transmission is in the neutral position or the in-gear position. The start control circuit 26 is therefore inhibited from reducing the speed of the engine 10 (i.e., turning the switch SCR1 ON) if the transmission 11 is shifted out of neutral when the engine is running above the minimum engine speed.

In one embodiment, the transmission switch 15 indicates the in-gear position when open and the neutral position when closed. Therefore, if one of the electrical conduits TS1 and TS2 is broken, the circuitry views the transmission switch 15 as being open and the engine 10 cannot start. In another embodiment, the transmission switch 15 position requirements may be reversed for operation.

When the transmission switch 15 is open during engine starting (i.e., the transmission 11 in the in-gear position), the switch SCR1 is turned ON by a signal through the resistor R5 and the rectifier D3 of the start control circuit 26 to the cathode of the switch SCR1. When the switch SCR1 turns ON it conducts and shunts the voltage of the center half-cycle of the ignition pulse through the resistor R9 and/or shunts it to the ground 18. As discussed above, the resistor R9 acts as a current limiting resistor. Accordingly, the voltage of the ignition pulse is limited to a value too low to cause the igniter 14 to ignite and the engine does not start.

When the transmission switch 15 is closed during initial engine starting (i.e., the transmission 11 in the neutral position), there is a short circuit from the anode of the rectifier D3 to the power node 104. This short circuit condition prevents the start control circuit 26 from turning ON the switch SCR1 and the voltage of the ignition pulse is thereby limited as discussed above. When the switch SCR1 is OFF, the entire voltage of the ignition pulse is provided to the igniter 14 in a normal manner and combustion events can therefore occur.

If the engine begins running, the electrical storage device C3 is charged through the resistor R6 and the rectifier D4 by the voltage of the ignition pulse. The electrical energy discharged from the electrical storage device C3 turns ON the semiconductor switch Q1 through the resistor R7. The semiconductor switch Q1 may include a darlington transistor, although other types of switches may be used.

When the semiconductor switch Q1 is turned ON while the engine is running, the output of the start control circuit 26 (i.e., the voltage present at the gate of the switch SCR1) is shunted to the ground node 106 through the semiconductor switch Q1, thereby preventing the output of the start control circuit 26 from reaching a sufficient voltage at the gate of the switch SCR1 to turn ON the switch SCR1. As a result, the engine 10 is not shut down due to shifting the transmission 11 out of neutral when the engine 10 is running above the minimum engine speed.

The resistor R8 may be used to select the engine speed between an engine starting speed and an engine running speed, at which the semiconductor switch Q1 is turned ON. As a result, the resistor R8 may be used to select the engine speed above which the inhibitor control circuit 28 inhibits the start control circuit 26 from shutting down the engine 10 due to the transmission 11 not being in neutral. Reducing the value of the resistor R8 increases the engine speed at which the inhibitor control circuit 28 inhibits the start control circuit 26. Increasing the value of the resistor R8 tends to reduce the effects of the bouncing of the transmission switch 15. The resistor R8 forms a voltage divider with the resistor R7 to determine what fraction of the electrical energy discharging from the electrical storage device C3 is delivered to the base of the semiconductor switch Q1. When the fraction of voltage delivered to the base is reduced, it takes a larger amount of electrical energy discharging from the electrical storage device C3 to reach the necessary biasing voltage for the semiconductor switch Q1 to turn ON. The voltage signal from the coil 13 is proportional to the engine speed and therefore a higher engine speed is needed to charge the electrical storage device C3 to a voltage high enough to bias the semiconductor switch Q1.

After the engine 10 has been shut down for any reason, the inhibitor control circuit 28 resets since the voltage from the electrical storage device C3 is no longer present to keep the semiconductor switch Q1 turned ON. During a subsequent restart attempt of the engine 10, engine starting is prevented if the transmission switch 15 indicates the transmission 11 is not in the neutral position.

With respect to the transmission interlock, the prevention circuit 102 acts as a filter to prevent transient voltages from the output of the start control circuit 26 from turning ON the switch SCR1.

In one embodiment, the rectifiers D1–D4 include diodes. In one embodiment, the resistors R1–R9 include standard resistors, although any type of resistive device could be utilized. Resistors R4 and R8 may include variable resistors if tuning of the circuitry is necessary to meet system requirements. Although the switches Z1 and Z2 are illustrated as zener diodes, other types of switches may be utilized.

Figure 6:
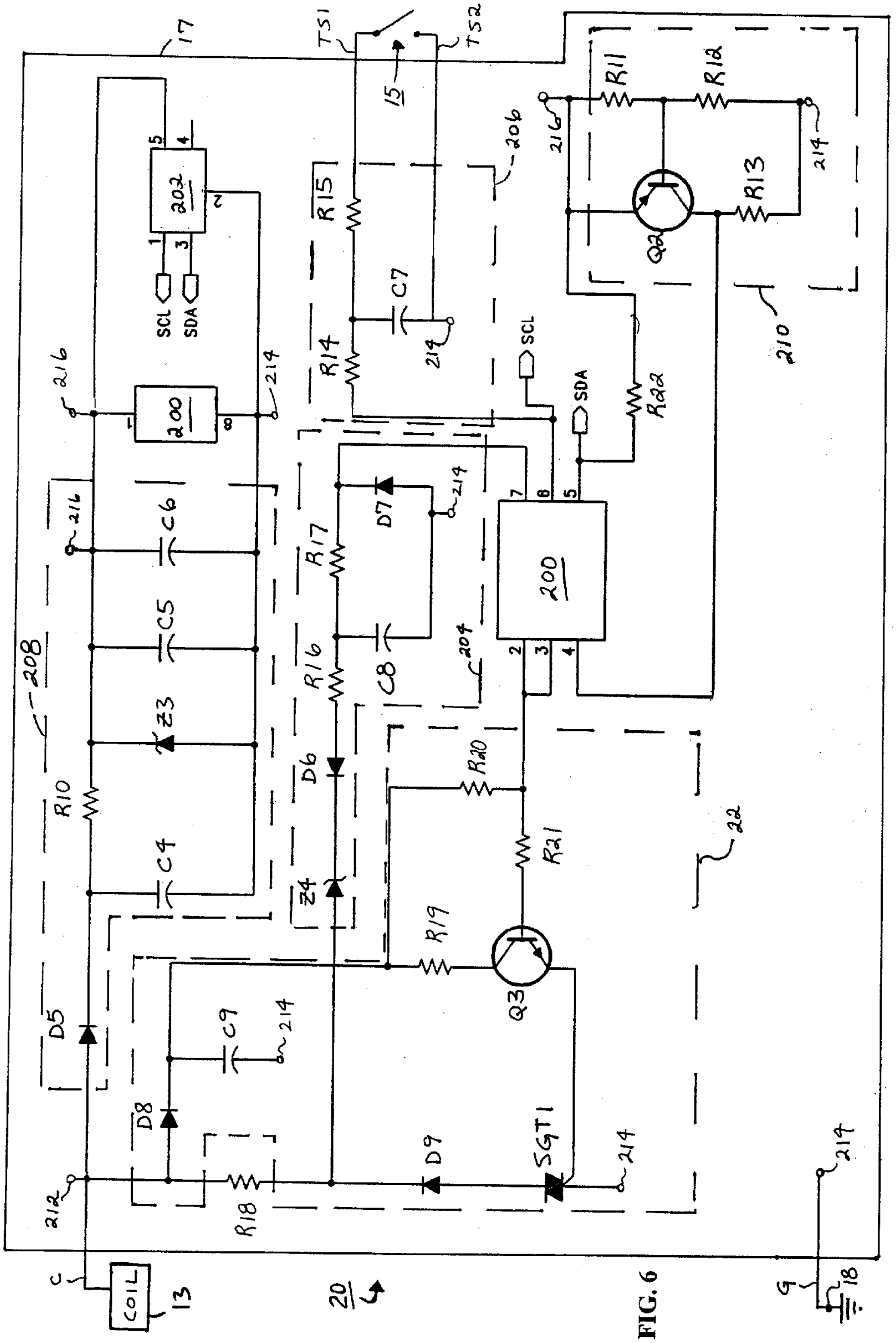
FIG. 6 is a schematic drawing of a digital version of the combination speed limiter and transmission interlock system illustrated in FIG. 4.

FIG. 6 is a schematic drawing of a digital version of the combination speed limiter and transmission interlock system 20. Referring to FIG. 6, the circuitry includes a programmable device 200 and a memory device 202. In one embodiment, the programmable device 200 is a PIC12C508 device 8-pin 8-bit CMOS micro-controller provided by Microchip Technology, Inc. of Chandler, Ariz. In one embodiment, the memory device 202 is a 24LC00 device 128-bit electrically erasable programmable read only memory ("EEPROM") provided by Microchip Technology, Inc. The circuitry further includes analog components utilized to provide functions associated with the programmable device 200 and the memory device 202. It should be understood that the digital version of circuitry of the present invention is capable of using other programmable devices, memory devices and analog components and that the programmable device 200, the memory device 202 and the analog components (discussed below) are merely shown and described as examples of one such programmable device, one such memory device and such analog components. For example, in another embodiment a PIC12CE518 device 8-pin 8-bit CMOS micro-controller provided by Microchip Technology, Inc. may be utilized. The PIC12CE518 micro-controller includes an integral EEPROM memory device, thereby eliminating the need for a separate memory device 202.

The portion of the circuitry used by the speed limiter includes the speed control circuit 24 (not shown in FIG. 6). The speed control circuit 24 includes a speed circuit 204 and the programmable device 200. The speed circuit 204 includes a zener diode or switch Z4, rectifiers D6 and D7, resistors R16 and R17 and an electrical storage device or capacitor C8. A resistor R18 is also associated with the speed circuit 204.

The portion of the circuitry used by the transmission interlock includes the start control circuit 26 (not shown in FIG. 6) and the inhibitor control circuit 28 (not shown in FIG. 6). The transmission switch 15 is also associated with the transmission interlock. In one embodiment, the circuitry is connected to the transmission switch 15 via the electrical conduits TS1 and TS2 that extend external to the housing 17. Alternatively, the circuitry may be connected to the transmission switch 15 via only one electrical conduit that extends external to the housing and the other side of the transmission switch 15 may be connected to the ground 18 or the coil 13 external to the housing 17. The start control circuit 26 includes a switch circuit 206 and the programmable device 200. The switch circuit 206 includes resistors R14 and R15 and electrical storage device or capacitor C7. The inhibitor control circuit 28 includes the speed circuit 204 and the programmable device 200.

Both the speed limiter and the transmission interlock further utilize the ignition control circuit 22, a power supply circuit 208, a brown-out circuit 210, a power node 212, a ground node 214 and a power signal node 216. The ignition control circuit 22 includes rectifiers D8 and D9, an electrical storage device or capacitor C9, resistors R19, R20 and R21, a semiconductor or other switch Q3, and a sensitive gate triac or other switch SGT1. The resistor R18 is also associated with the ignition control circuit 22. The power supply circuit 208 includes electrical storage devices or capacitors C4, C5 and C6, a resistor R10, a rectifier D5 and a zener diode or switch Z3. The brown-out circuit 210 includes resistors R11, R12 and R13 and a semiconductor or other switch Q2. In one embodiment, the power node 212 is connected to the coil 13 via the electrical conduit C which extends external to the housing 17. The power node 212 preferably provides the electrical energy associated with the ignition pulse. In one embodiment, the ground node 214 is connected to the ground 18 via the electrical conduit G which extends external to the housing 17. The power node 212, the ground node 214 and the power signal node 216 are illustrated as individual nodes, each node being electrically coupled to the other similarly numbered nodes.

The power supply circuit 208 is utilized to provide power (e.g., +5 volts) and ground (e.g., 0 volts) to the programmable device 200 and the memory device 202. In one embodiment, the power node 212 and the ground node 214 are utilized by the power supply circuit 208 to provide power and ground to the programmable device 200 and the memory device 202. The power signal node 216 provides a power signal to the circuitry. The power signal is generated when the electrical energy associated with the ignition pulse is filtered by the power supply circuit 208. The ground node 214 is utilized directly to provide ground. Provision of power through the use of the power node 212 (via the power signal node 216) thereby eliminates the need for a battery to provide power.

However, low speed characteristics of the ignition pulse result in the need for a power supply circuit that is efficient and that stores electrical energy. The power supply circuit 208 meets such demands. In other embodiments, other types of power supplies and/or power supply circuits may be utilized to provide power to the programmable device 200 and the memory device 202.

The positive valued leading half-cycle and trailing half-cycle of the ignition pulse are utilized to generate the power signal that provides power to the programmable device 200 and the memory device 202. During each of the leading half-cycles and the trailing half-cycles, the electric storage device C4 charges via the rectifier D5. The electrical storage device C4 is sized to provide the power signal to the programmable device 200 and the memory device 202 even when the crankshaft and the flywheel of the power train 9 are rotating at a slow speed (e.g., 300 revolutions per minute ("RPM")). The power supply circuit 208 is configured to allow only the components of the ignition pulse having a voltage greater than the voltage drop across the rectifier D5 (e.g., 0.7 volts) to be utilized to charge the electrical storage device C4.

After the leading half-cycle and the trailing half-cycle of the ignition pulse reach their peak and fall below the minimum voltage required to sustain conduction through the electrical storage device C4 and the rectifier D5, the electrical storage device C4 stops charging and begins to discharge through the resistor R10. Discharging of the electrical storage device C4 through the resistor R10 produces the power signal and charges the electrical storage devices C5 and C6. The electrical storage device C5 is designed to act as a bulk electrical storage device (i.e., provide electrical energy for the power signal when electrical storage device C4 is not providing electrical energy for the power signal). The combination of the resistor R10, the electrical storage device C5 and C6 and the zener diode Z3 acts as a filter (i.e., a low-pass filter) to remove noise from the power signal, to limit the voltage of the power signal to a predetermined value regardless of the amount of electrical energy stored in the electrical storage device C4, and to prevent transient voltages from adversely affecting the programmable device 200 and the memory device 202.

The programmable device 200 and the memory device 202 are connected to the power signal node 216 at pin 1 and pin 5, respectively. The programmable device 200 and the memory device 202 are connected to the ground node 214 at pin 8 and pin 2, respectively. If the power signal drops below a level required to sustain operation of the programmable device 200, but not to value that results in a power down of the programmable device 200 (e.g., approximately 0 volts), the brown-out circuit 210 detects the insufficient voltage and causes the programmable device 200 to perform a reset. The programmable device 200 is held in reset mode until the power signal returns to the level required to sustain operation of the programmable device 200, or until the power signal drops to a level where the programmable device 200 is powered down. The memory device 202 does not include the same operational requirements as the programmable device 200 and can therefore be removed from the power signal at any time without requiring resetting.

The brown-out circuit 210 may be designed in accordance with a number of embodiments generally known in the art (e.g., those disclosed in the PIC12C508 device data sheet). Alternatively, a programmable device that includes brown-out functionality on-board may be utilized. The semiconductor switch Q2 of the illustrated embodiment is designed to turn OFF when the power signal drops below a level such that the voltage at the base of the semiconductor switch Q2 is lower than the voltage (i.e., biasing voltage) required to sustain conduction through the semiconductor switch Q2 (e.g., 0.7 volts). The characteristics of the semiconductor switch Q2 and the resistors R11 and R12 establish the level the power signal needs to drop below to cause a reset of the programmable device 200. The illustrated brown-out circuit 210 is designed to cause a reset when the power signal drops to 2.8 volts. The programmable device 200 has a range of specified operating voltages from 2.5 volts to 5.5 volts. The programmable device 200 is connected to the brown-out circuit 210 at pin 4. The semiconductor switch Q2 may include a transistor, although other types of switches may be used.

The switch circuit 206 is configured to provide an input to the programmable device 200 corresponding to the position of the transmission 11 (e.g., the neutral position or the in-gear position). The programmable device 200 is connected to the switch circuit 206 at pin 6. A pull up resistor internal to the programmable device 200 at pin 6 provides current to the switch circuit 206. In one embodiment, a short circuit condition (i.e., logic 0) is observed when the transmission switch 15 is closed (i.e., the transmission 11 is in the neutral position), and an open circuit condition (i.e., logic 1) is observed when the transmission switch 15 is open (i.e., the transmission is in the in-gear position). In another embodiment, the transmission switch position requirements may be reversed for operation. In one embodiment, the threshold between the short circuit condition and the open circuit condition is a value less than 1000 ohms (e.g., 300 ohms). The combination of the resistor R14 and the electrical storage device C7 acts as a filter (i.e., a low-pass filter) to remove noise from the input to the programmable device 200 corresponding to the position of the transmission 11, and to prevent transient voltages from adversely affecting the programmable device 200.

The speed circuit 204 is configured to provide an input to the programmable device 200 corresponding to the speed of the engine 10. In one embodiment, the speed circuit 204 provides an input to the programmable device 200 corresponding to each occurrence of the center half-cycle of the ignition pulse. Commonly, a single center half-cycle of the ignition pulse is generated each time the crankshaft and the flywheel of the power train 9 revolve (i.e., once per revolution). The speed of the engine 10 is typically expressed in terms of RPM. Thus, provision of an input corresponding to each revolution can be utilized by the programmable device 200 to determine the speed of the engine 10 (as discussed below).

As discussed above, the center half-cycle is commonly used to cause the igniter 14 to ignite. In a four-stroke engine, two ignition pulses may be generated for each engine cycle, and thus two center half-cycles of the ignition pulse may be generated for a single engine cycle. The second center half-cycle of the engine cycle may be limited or blanked such that the igniter 14 does not ignite because the second center half-cycle of the engine cycle is not utilized for a combustion event.

In one embodiment, the speed circuit 204 acts as a center half-cycle detector. The speed circuit 204 receives electrical energy from the power node 212 via the resistor R18. The zener diode Z4 and the rectifier D6 establish a threshold level (e.g., –5 volts) to ensure only the center half-cycle component of the ignition pulse is detected. The components (e.g., the leading half-cycle and the trailing half-cycle) of the ignition pulse that do not meet the threshold level are limited.

The programmable device 200 is connected to the speed circuit 204 at pin 7. A pull up resistor internal to the programmable device 200 at pin 7 provides electrical energy to the speed circuit 204. The electrical energy is utilized by the speed circuit 204 to charge the electrical storage device C8 through the resistor R17. The rectifier D7 protects the programmable device 200 from experiencing excessive negative current draw from pin 7. In one embodiment, when the electrical storage device C8 is charged, the programmable device 200 detects a logic 1 condition. The electrical storage device C8 remain charged until electrical energy of the center half-cycle reaches the electrical storage device C8 through the zener diode Z4, the rectifier D6 and the resistor R16 and causes the electrical storage device C8 to quickly discharge. When the electrical storage device C8 is discharged (i.e., discharged or only charged a nominal value, e.g., 2.5 volts), the programmable device 200 detects a logic 0 condition.

After a short period (e.g., 5 ms), the electrical energy provided to the speed circuit 204 by the programmable device 200 recharges the electrical storage device C8 and programmable device 200 again detects a logic 1 condition. When the electrical storage device C8 is charged, the electrical storage device C8 is ready to detect the next occurrence of the center half-cycle. As discussed below, the programmable device 200 utilizes timers to determine the time between corresponding logic conditions to calculate the speed of the engine 10.

The ignition control circuit 22 is configured to limit the voltage of the ignition pulse to a value too low to cause the igniter 14 to ignite by shunting the voltage of the ignition pulse to the ground node 214 and/or through a current limiting device (not shown). In the illustrated embodiment, the ignition control circuit 22 limits the voltage of the ignition pulse by shunting the voltage of the ignition pulse to the ground node 214 through the switch SCR1 when the switch SGT1 is turned ON. The rectifier D9 ensures that only the center half-cycle of the ignition pulse is shunted to the ground node 214. Generally, the switch SCR1 is properly biased to turn ON when the semiconductor switch Q3 is turned ON. The ignition control circuit 22 is configured to turn ON the semiconductor switch Q3 when the programmable device 200 is not active and when the programmable device 200 provides an output signal corresponding to a limit condition YES. As discussed herein, the output signal corresponding to a limit condition YES may include a logic 1 condition and/or a lack of a logic 0 condition (i.e., no signal). The semiconductor switch Q3 may include a transistor, although other types of switches may be used.

During each of the leading half-cycle and the trailing half-cycle of the ignition pulse, the electric storage device C9 charges via the rectifier D8. The rectifier D8 is configured to allow only the components of the ignition pulse having a voltage greater than the voltage drop across the rectifier D8 (e.g., 0.7 volts) to be utilized to charge the electrical storage device C9.

After the leading half-cycle and the trailing half-cycle of the ignition pulse reach their peak and fall below the minimum voltage required to sustain conduction through the electrical storage device C9 and the rectifier D8, the electrical storage device C9 stops charging and begins to discharge. As the electrical energy of the electrical storage device C9 discharges, a collector biasing voltage is generated at the collector of the semiconductor switch Q3. A base biasing voltage adequate to turn ON the semiconductor switch Q3 may also be generated at the base of the semiconductor switch Q3 if the programmable device 200 is not providing an output signal corresponding to a limit condition NO.

The collector biasing voltage is generated by the electrical energy discharging from the electrical storage device C9 through the resistor R19. The base biasing voltage may be generated by the electrical energy discharging from the electrical storage device C9 through the resistors R20 and R2 or by the electrical energy discharging from the electrical storage device C9 through the resistors R20 and R21 in combination with electrical energy provided by the programmable device 200 when the programmable device 200 is providing an output signal corresponding to the limit condition YES. The programmable device 200 is connected to the ignition control circuit 22 at pin 2 and pin 3 (i.e., pin 2 and pin 3 are electrically coupled external to the programmable device 200). In one embodiment, an output corresponding to the limit condition NO is logic 0 and an output corresponding to the limit condition YES is equivalent to a logic 1. As discussed above, the limit condition YES may exist with no action on the part of the programmable device 200 (i.e., the signal present at pin 2 and pin 3 is a function of the electrical energy discharging from the electrical storage device C9 through resistors R20 and R21).

The signal output by the programmable device 200 in the logic 0 state decreases the base biasing voltage and the base current of the semiconductor switch Q3 thereby causing the semiconductor switch Q3 to turn OFF. The characteristics of the semiconductor switch Q3 establish the levels of biasing voltages and base currents required to turn the semiconductor switch Q3 ON and OFF.

The electrical storage device C9 of the ignition control circuit 22 is designed to act as a bulk electrical storage device. The bulk electrical storage design of the electrical storage device C9 allows for the center half-cycle of the ignition pulse to be shunted to the ground node 214 whenever generated if the programmable device 200 is not providing an output signal corresponding to the limit condition NO. The voltage provided by the electrical storage device C9 is required to properly bias the semiconductor switch Q3 to turn ON such that the switch SGT1 turns ON to allow such shunting of the center half-cycle of the ignition pulse to the ground node 214.

The programmable device 200 communicates with the memory device 202 via a SDA (serial data) line and a SCL (serial clock) line in accordance with the architecture of the programmable device 200 and the memory device 202. The SDA line corresponds to pin 5 of the programmable device 200 and pin 3 of the memory device 202. The SDA line is utilized to transfer data between the programmable device 200 and the memory device 202. The SCL line corresponds to pin 6 of the programmable device 200 and pin 1 of the memory device 202. The SCL line is utilized to synchronize the transfer of data between the programmable device 200 and the memory device 202. A resistor R22 is utilized as a pull-up resistor for the SDA line to properly bias pin 5 of the programmable device 200. The resistor R22 is connected to the power signal node 216 to provide such biasing.

The programmable device 200 generates data corresponding to the number of operating hours (or parts thereof) of the power train 9. Such data is stored in the memory device 202 and is accessible for use in determining the number of operating hours of the power train 9. The number of operating hours of the power train 9 is read from the combination speed limiter and transmission interlock system 20 when the power train 9 is not operating (i.e., the engine is not started). Because the power train 9 is not operating, the ignition pulse cannot be utilized to provide power to the programmable device 200 and the memory device 202. In one embodiment, a battery (e.g., 9 volt battery) can be utilized as a temporary power source for the programmable device 200 and the memory device 202 by connecting the battery to the electrical conduits C and G that extend external of the housing 17.

When the battery is utilized as a power source, the programmable device 200 recognizes that the speed of the engine is null (i.e., because the power train is not operating) and determines that the combination speed limiter and transmission interlock system 20 is in a service mode. The programmable device 200 communicates with the memory device 202 to determine the up-to-date number of operating hours of the power train 9 and outputs a signal corresponding to the number of operating hours of the power train 9. In one embodiment, the programmable device 200 outputs a voltage signal that corresponds to the number of operating hours of the power train 9 (e.g., 0 volts=0 hours, 1 volt =100 hours, 2 volts=200 hours, 3 volts=300 hours, 4 volts=400 hours, 5 volts=500 hours and any fractional portion of a volt corresponds to a fractional portion of 100 hours). A volt meter may be utilized to read the output voltage signal. The voltage signal can be read by placing the leads of the volt meter on a portion of the electrical conduits G and TS1 that extend external of the housing 17. Once the number of operating hours of the power train 9 has been read, the battery may be removed and the power train 9 readied for operation.

The programmable device 200 utilizes a software program having a plurality of instructions, and interprets and executes the software instructions to perform speed limiter and transmission interlock functions. The software may also perform additional functions related to, among other things, calculation of the operating hours of the power train 9.

Figure 7:
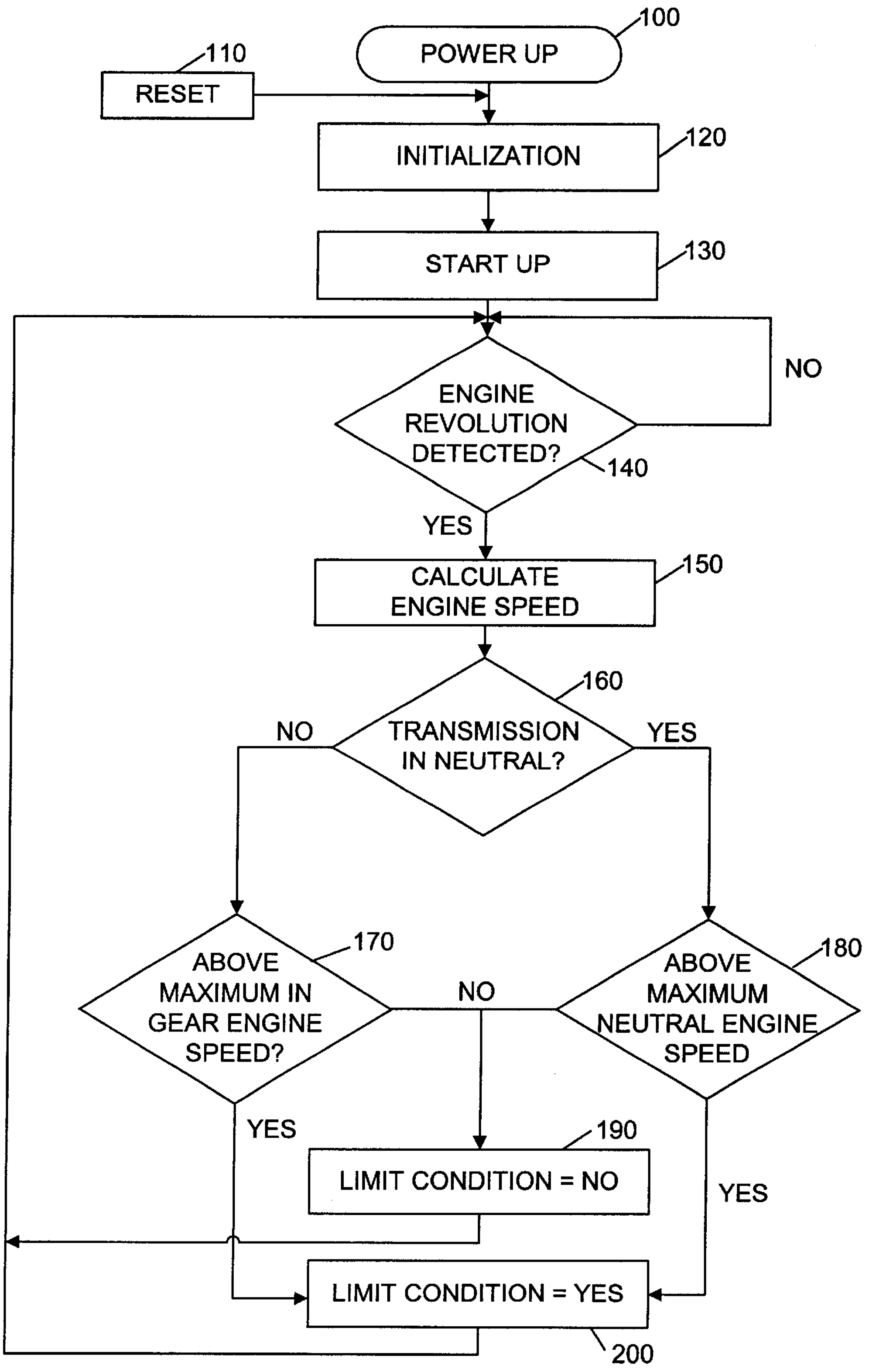
FIG. 7 is a flow chart of software used in the digital version of the combination speed limiter and transmission interlock system.

The software used by the programmable device 200 is illustrated in the flow chart of FIG. 7. Before the software is executed, the programmable device 200 is powered up as shown at step 100. In order to power up the programmable device 200 using the power supply circuit 40, the magnet disposed on the flywheel magnetically interacts with the coil 13. The operator may cause the magnet to magnetically interact with the coil 13 by pulling the pull cord associated with the power train 9, engaging an electric starter, or by otherwise rotating the flywheel. As the pull cord is pulled, the flywheel rotates and the magnet disposed on the rotating flywheel magnetically interacts with the coil 13. As the magnet magnetically interacts with the coil 13, the voltage of the ignition pulse illustrated in FIG. 3 is generated. As discussed above, the leading half-cycle and the trailing half-cycle of the ignition pulse are utilized by the power supply circuit 208 to generate the power signal utilized to power up the programmable device 200. Once the engine 10 of the power train 9 is running, the flywheel (which is coupled to the crankshaft) continues to rotate thereby allowing the power supply circuit 208 to generate a continuous power signal for the programmable device 200.

If the operator performs a slow or blank pull when attempting to start the engine 10, the leading half-cycle and the trailing half-cycle of the ignition pulse may not have enough voltage to produce a power signal that is adequate to power up the programmable device 200. As discussed above, the brown-out circuit 210 is utilized to ensure the programmable device 200 only operates when the power signal is within the operating range of voltages of the programmable device 200.

As shown at step 110, when the brown-out circuit 210 resets the programmable device as discussed above, the programmable device 200 returns to the same portion of the software as is reached when the programmable device 200 is initially powered up.

As shown at step 120, the software performs initialization by setting-up and configuring the programmable device 200 for operation. Initialization includes configuration of system registers including hardware port control registers, port input/output ("I/O") registers, various timer registers and interrupt control registers. The system registers are used for operation of the programmable device 200 and for interfacing of the programmable device 200 with the other components of the combination speed limiter and transmission interlock system 20.

As shown at step 130, the software performs initial startup functions. At step 130 the software performs a check of the position of the transmission 11. If the transmission 11 is in the in-gear position, the software generates an output corresponding to the limit condition YES that is then output to the ignition control circuit 22. If the transmission is in the neutral position, the software generates an output corresponding to the limit condition NO that is then output to the ignition control circuit 22. At step 130 the software also performs a check for the service mode discussed above. If no change is detected in the logic state of pin 7 over a set amount of time (i.e., no negative center half-cycles are detected) then the software determines that the speed of the engine 10 is null and that the combination speed limiter and transmission interlock system 20 is therefore in the service mode. When in the service mode, the software causes the programmable device 200 to communicate with the memory device 202 to determine the up-to-date number of operating hours of the power train 9. The software then generates an output signal corresponding to the number of operating hours of the power train 9. At step 130, the software also starts the timer utilized to determine the number of operating hours of the power train 9. The timer is designed to run continuously when the power train 9 is operating. The software periodically polls the timer throughout the software to determine if data corresponding to the number of operating hours of the power train 9 needs to be communicated to the memory device 202. The data may be intermittently stored in the memory (e.g., RAM) of the programmable device 200 before it is communicated to and stored in the memory device 202.

When the startup functions are completed, the software moves into the run loop portion of the software. As shown at step 140, the software determines if a center half-cycle of the ignition pulse has been detected by the speed circuit 204. As discussed above, the logic state of pin 7 changes when a center half-cycle is detected. If an engine revolution has not been detected the software returns to step 140 and continues to loop until an engine revolution is detected. If an engine revolution is not detected for a certain amount of time, the engine 10 may no longer be running and the programmable device 200 may therefore enter the reset mode and/or the power down mode (i.e., the power supply circuit 208 no longer can provide the continuous power signal because the electrical storage device C4 cannot charge via the power node 212).

If an engine revolution has been detected, the software moves to step 150, and calculates the speed of the engine 10 based upon available data. The software utilizes a timer that times the time duration from one center half-cycle occurrence to the next center half-cycle occurrence. The time between two such occurrences is representative of the speed of the engine 10 (e.g., 200 msec corresponds to 300 RPM, 67 msec corresponds to 900 RPM, and the like). The software may also utilize an averaging function of any number of consecutive center half-cycle to center half-cycle times to determine an average engine speed.

As shown at step 160, the software next determines if the transmission 11 is in the neutral position. If pin 6 is in a logic 0 state, the transmission switch 12 is indicating the transmission 11 is in the neutral position. If pin 6 is in a logic 1 state, the transmission switch 15 is indicating the transmission 11 is in the in-gear position. If the transmission 11 is in the in-gear position, the software proceeds to step 170 to determine if the engine is operating at or above the operational limit speed. If the transmission 11 is in the neutral position, the software proceeds to step 180 to determine if the engine 10 is operating at or above the pre-shift limit speed. Each limit speed can be defined in the software such that the voltage of the ignition pulse is limited to reduce the speed of the engine 10.

If the software proceeds to step 170 and determines that the engine 10 is operating at or above the operation limit speed, the software proceeds to step 200 and generates an output corresponding to the limit condition YES. If the software proceeds to step 170 and determines that the engine 10 is not operating at or above the operational limit speed, the software proceeds to step 190, and generates an output corresponding to the limit condition NO.

If the software proceeds to step 180 and determines that the engine 10 is operating at or above the pre-shift limit speed, the software proceeds to step 200 and generates an output corresponding to the limit condition YES. If the software proceeds to step 180 and determines that the engine is not operating at or above the pre-shift limit speed, the software proceeds to step 190 and generates an output corresponding to the limit condition NO.

After the software has executed step 190 or 200, the software returns to the beginning of the run loop at step 140 and continues to perform speed limiter and transmission interlock functions.

If at any time the power signal drops to a level (e.g., approximately zero) at which the brown-out circuit 210 is no longer able to hold the programmable device 200 in reset mode, the programmable device 200 is powered down and the software is exited. Upon restarting the programmable device 200 the software begins at step 100 and then proceeds through the software as discussed above.

In one embodiment, the rectifiers D5–D9 include diodes. In one embodiment, the resistors R10–R22 include standard resistors, although any type of resistive device could be utilized. Although the switches Z3 and Z4 are illustrated as zener diodes, other types of switches may be utilized.

It should be understood that the combination speed limiter and transmission interlock system 20 may include circuits of other configurations. The analog version of circuitry and the digital version of circuitry discussed above are just two examples of such circuitry. Other circuits may include fewer or more components.

Thus, the invention provides, among other things, a combination speed limiter and transmission interlock system. Various features and advantages of the invention are set forth in the following claims.

What is claimed is:

1. A combination speed limiter and transmission interlock system for an engine-transmission power train, the engine having a coil that outputs an ignition pulse and an igniter that ignites an air-fuel mixture, the transmission being interconnected to a switch that indicates one of a neutral position of the transmission and an in-gear position of the transmission, the combination speed limiter and transmission interlock system comprising:

an ignition control circuit, connected in circuit with the coil, that prevents the igniter from igniting the air-fuel mixture;

a speed control circuit, connected in circuit with the ignition control circuit, that causes the ignition control circuit to prevent the igniter from igniting the air-fuel mixture when the engine exceeds a limit speed; and a start control circuit, connected in circuit with the switch and the ignition control circuit, that causes the ignition control circuit to prevent the igniter from igniting the air-fuel mixture when the transmission switch indicates the in-gear position of the transmission during starting of the engine.

2. The system of claim 1, wherein the engine-transmission power train includes an outboard motor.

3. The system of claim 1, further comprising a single housing that substantially contains the combination speed limiter and transmission interlock system.

4. The system of claim 3, further comprising a power node that is electrically coupled to the coil by an electrical conduit that extends external of the housing.

5. The system of claim 3, further comprising a ground node that is electrically coupled to ground by an electrical conduit that extends external to the housing.

6. The system of claim 3, wherein the start control circuit is electrically coupled to the switch by two electrical conduits that extend external to the housing.

7. The system of claim 1, wherein the ignition control circuit further comprises a second switch that limits the voltage of the ignition pulse to prevent the igniter from igniting the air-fuel mixture.

8. The system of claim 7, wherein the second switch includes a silicon controlled rectifier.

9. The system of claim 7, wherein the second switch includes a transistor.

10. The system of claim 7, wherein the second switch limits the voltage of the ignition pulse by shorting the ignition pulse to a ground.

11. The system of claim 7, wherein the ignition control circuit further comprises a current limiting resistor, and wherein the second switch limits the voltage of the ignition pulse by shunting the ignition pulse through the current limiting resistor to ground.

12. The system of claim 7, further comprising a prevention circuit that prevents transient signals from turning ON the second switch.

13. The system of claim 12, wherein the prevention circuit includes a second electrical storage device, and a resistor that allows the second electrical storage device to discharge between operating cycles of the engine.

14. The system of claim 7, wherein the speed control circuit causes the ignition control circuit to prevent the igniter from igniting the air-fuel mixture by turning ON the second switch when the engine exceeds the limit speed.

15. The system of claim 14, wherein the speed control circuit further comprises an electrical storage device that receives electrical energy of the ignition pulse, and wherein the second switch is turned ON when the speed circuit receives electrical energy from the electrical storage device that is above a predetermined value.

16. The system of claim 15, wherein the speed circuit further comprises a third switch that is responsive to the electrical energy received from the electrical storage device, wherein the predetermined value is set by the third switch.

17. The system of claim 7, wherein the start control circuit causes the ignition control circuit to prevent the igniter from igniting the air-fuel mixture by turning ON the second switch when the first switch indicates the in-gear position of the transmission during starting of the engine.

18. The system of claim 1, wherein the speed control circuit further comprises a limit speed resistor that can be set to establish the value of the limit speed of the engine.

19. The system of claim 18, wherein the limit speed resistor includes a variable resistor.

20. The system of claim 1, wherein the speed control circuit further comprises an electrical storage device that receives electrical energy of the ignition pulse.

21. The system of claim 20, wherein the electrical storage device receives electrical energy of the ignition pulse during a leading half-cycle of the ignition pulse.

22. The system of claim 20, wherein the speed control circuit further comprises a speed circuit that includes a second switch that limits the voltage of the electric storage device to a predetermined value regardless of the voltage of the ignition pulse.

23. The system of claim 1, further comprising an inhibitor control circuit, connected in circuit with the ignition control circuit and the start control circuit, that prevents the start control circuit from causing the ignition control circuit to prevent the igniter from igniting the air-fuel mixture when the transmission switch indicates the in-gear position of the transmission during running of the engine.

24. The system of claim 23, wherein the inhibitor control circuit further comprises a second switch connected such that the inhibitor control circuit is activated by turning ON the second switch.

25. The system of claim 24, wherein the second switch includes a semiconductor switch.

26. The system of claim 24, wherein the second switch is turned ON when a minimum engine speed is reached.

27. The system of claim 26, wherein the value of the minimum engine speed is the engine speed required to drive the transmission.

28. The system of claim 26, wherein the value of the minimum engine speed is adjustable.

29. The system of claim 23, further comprising a reset circuit that resets the inhibitor control circuit when the engine is shut down.

30. The system of claim 1, further comprising a programmable device connected in circuit with the ignition control circuit, wherein the speed control circuit includes a speed circuit that provides the programmable device with a speed signal corresponding to the speed of the engine, and wherein the start control circuit includes a switch circuit that provides the programmable device with a position signal corresponding to one of the neutral position of the transmission and the in-gear position of the transmission.

31. The system of claim 30, wherein the programmable device utilizes the speed signal to calculate the speed of the engine.

32. The system of claim 30, wherein the programmable device utilizes the position signal to determine if the transmission is in the neutral position.

33. The system of claim 30, wherein the programmable device outputs a limit signal to the ignition control circuit to cause the ignition control circuit to prevent the igniter from igniting the air-fuel mixture when at least one predetermined condition exists.

34. The system of claim 33, wherein the at least one predetermined condition exists when the value of the speed of the engine is above the value of a maximum operational limit speed.

35. The system of claim 33, wherein the at least one predetermined condition exists when the transmission is in the in-gear position and the value of the speed of the engine is below the value of a minimum operational engine speed.

36. The system of claim 33, wherein the at least one predetermined condition exists when the transmission is in the neutral position and the value of the speed of the engine is above the value of a minimum operational engine speed.

37. The system of claim 33, wherein the ignition control circuit further comprises a second switch that turns ON in response to the limit signal.

38. The system of claim 37, wherein the second switch includes a sensitive gate triac.

39. The system of claim 37, wherein the second switch includes a transistor.

40. The system of claim 30, wherein the programmable device outputs a limit signal to the ignition control circuit to prevent the ignition control circuit from preventing the igniter from igniting the air-fuel mixture when at least one predetermined condition exists.

41. The system of claim 40, wherein the at least one predetermined condition exists when the value of the speed of the engine is below the value of a maximum operational limit speed and the transmission is in the neutral position.

42. The system of claim 40, wherein the at least one predetermined condition exists when the transmission is in the in-gear position and the value of the speed of the engine is below the value of a maximum operational engine speed.

43. The system of claim 30, further comprising a power supply circuit configured to provide a power signal to the programmable device.

44. The system of claim 43, further comprising a brown-out circuit that provides a reset signal to the programmable device when the power signal drops below a predetermined value.

45. The system of claim 30, wherein the speed circuit includes an electrical storage device that is responsive to a center half-cycle of the ignition pulse and that discharges when the center half-cycle is detected, thereby generating the speed signal.

46. The system of claim 1, further comprising a device that outputs an operating hours signal corresponding to the number of operating hours of the power train.

47. The system of claim 46, further comprising a single housing that substantially contains the combination speed limiter and transmission interlock system, and wherein the operating hours signal is a voltage that can be measured external to the housing using a volt meter.

48. The system of claim 46, further comprising a memory device associated with the first device that stores data corresponding to a number of operating hours of the power train.

* * * * *